United States Patent [19]

Blanz

[11] Patent Number: 5,203,375

[45] Date of Patent: Apr. 20, 1993

[54] LEVELING VALVE

[75] Inventor: Roland Blanz, Heiligkreuzsteinach, Fed. Rep. of Germany

[73] Assignee: Grau GmbH, Heidelberg, Fed. Rep. of Germany

[21] Appl. No.: 657,655

[22] Filed: Feb. 19, 1991

[30] Foreign Application Priority Data

Mar. 12, 1990 [DE] Fed. Rep. of Germany ....... 4007828

[51] Int. Cl.$^5$ ............................................. F16K 31/52
[52] U.S. Cl. .................................. 137/627.5; 251/261
[58] Field of Search ..................... 137/627.5; 251/260, 251/261

[56] References Cited

U.S. PATENT DOCUMENTS

| 2,797,061 | 6/1957 | Buchanan | 251/261 X |
| 2,905,462 | 9/1959 | Christensen | 137/627.5 X |
| 4,886,092 | 12/1989 | Barzelay | 137/627.5 |

FOREIGN PATENT DOCUMENTS

| 2451349 | 5/1975 | Fed. Rep. of Germany . |
| 584008 | 1/1947 | United Kingdom | 251/261 |

Primary Examiner—Robert G. Nilson
Attorney, Agent, or Firm—Hopkins & Thomas

[57] ABSTRACT

A leveling valve for the automatic stabilization of the chassis height of a vehicle, especially of a motor vehicle with pneumatic shock absorption, having a valve housing (1) with a spring-loaded double valve body (11), an inlet seat (16) for the double valve body (11), and a hollow valve plunger (25) carrying an outlet seat (26) for the double valve body (1), being movable in the axial direction, and being assigned to a gasket (22) disposed in a groove (21), which may be axially readjusted for the purpose of adjusting the locking position in relation to a supporting element (30) resting on a cam (43) of a shaft (48) that runs transversally to the central axis (2) of the valve plunger (25) and is torsion-proof. The position of the supporting element (30) in relation to the housing (1) may be changed by means of an actuating lever (45) disposed outside of the housing, swiveling and acting on the shaft (38). The housing (1) is made of synthetic material and possesses an axially continuous bore hole (3) with a smallest section disposed in the central area and with adjacent stepped sections increasing towards both ends. Further essential structural elements, e.g. the shaft (38) and/or the valve plunger (25) and/or the supporting element (30) etc. consist of synthetic material. The shaft (38) is received in the housing (1) at both sides of the central axis (2) of the valve plunger (25).

2 Claims, 3 Drawing Sheets

FIG 4

LEVELING VALVE

FIELD OF THE INVENTION

This invention comprises a leveling valve for the automatic stabilization of the chassis height of a vehicle, in particular of a motor vehicle with pneumatic shock absorption.

BACKGROUND OF THE INVENTION

A leveling valve of this kind is known from DE-PS 33 33 888. In a valve housing, a spring-loaded double valve body is provided, possessing an inlet valve with an inlet seat for a conduit leading to one or several pneumatic bellows. A hollow valve plunger which is supported in a movable way a with its upper end forms an outlet seat assigned to the double valve body acts jointly with the double valve body. The valve plunger is supported by means of a supporting element at a shaft accommodated at the valve housing in a rotating way, that is at a cam formed at this shaft. The shaft may be rotated by means of an actuating lever at the outside of the valve housing so that in this way a rotating motion of the shaft is transformed into an axial motion of the valve plunger. In order to adjust a locking position between inlet valve and outlet valve the valve plunger is supported in a rotating way in relation to the supporting element in a thread linking both parts with on another, the supporting member in turn being guided in the valve housing in a torsion-proof and axially movable manner. A gasket for the sealing of the conduit leading to the pneumatic bellows is assigned to the valve plunger, which is disposed in an only radially open groove in a special inset. The individual parts of the leveling valve are mostly designed as metal parts and are manufactured in an accordingly precise manner, usually by means of a machining process. The bearing of the rotatable shaft is located on one side of a central axis constituted by the valve plunger, the double valve body and the supporting element. This bearing is bedded in a sprue spigot in the valve housing made of metal, causing the valve housing to be designed in the necessary costly manner.

In DE-OS 2451349 a leveling valve is shown whose shaft that can be rotated by means of the actuating lever is received in a continuous bore hole in the valve housing, the bearing being disposed symmetrically to the central axis of the valve plunger. In this way, the support of the supporting element and thus of the valve plunger on the cam of the shaft is improved. Between the double valve body and the cam of the shaft, the valve plunger and the support element are provided both of which may be screwed onto one another by means of threads in order to secure a membrane that serves the purpose of sealing the conduit leading to the pneumatic bellows. However, it cannot be used for adjusting a locking position. In the case of this leveling device some structural elements are already made of synthetic material, e.g. the valve body and the supporting element. It is nothing special to produce valve bodies out of synthetic material or an elastomer, in order to exploit the flexibility of this material in connection with valve seats. The good sliding characteristics of synthetic material bring about a reduction of the friction between supporting element and shaft or cam by means of the supporting element. A design fundamentally different from the design made of metal aiming at designing as many essential structural elements of a leveling valve as synthetic material parts cannot be recognized.

All known leveling valves possess a number of structural elements which to a large degree consist of metal and require careful processing in regard to tolerances in order to achieve the desired operating safety. As a rule, the valve housing which is also made of metal, is designed in several parts in order to enable or simplify the assembly of the leveling valve. The bedding of the rotatable shaft disposed on one side of the central axis of the leveling valve formed by the valve plunger must be arranged with the necessary care so that the take-up of forces of a spring holding the supporting element in contact with the cam of the shaft is rendered possible. In addition, such a leveling valve must be of a certain size, on the one hand, in order to offer the required sections for the ventilation of the pneumatic bellows; on the other hand, one seeks to offer this kind of leveling valves as inexpensively as possible.

BRIEF DESCRIPTION OF THE INVENTION

The invention proceeds from this cluster of problems and aims at creating an inexpensive leveling valve of the kind mentioned at the outset that is easy to manufacture and to assemble.

To a large extent, the housing of the leveling valve is of one-piece design and may be made of metal or also of synthetic material. By means of disposing a continuous bore hole (3) with its sections essentially adjacent and increasing toward the two ends of the housing, it become possible to insert, mount and bed the other structural elements from both sides of the housing. In the course of this process the shaft is inserted transversally to the central axis of the valve plunger, so that by this a part of the structural elements can be secured in the housing. For inserting the shaft in this way it is necessary that the cam does not stand out from the corresponding adjacent diameter of the shaft, but that it is designed as being of smaller or at the most of a size equal to the adjacent diameter. Nevertheless, also in this case the adjustability of the locking position is achieved. During assembly, some of the structural elements may be held in the housing by means of some type of snap connection. Due to the bilateral bedding of the shaft in relation to the central axis the take-up of forces between the supporting element and the cam of the shaft is improved and it becomes possible to insert more generously toleranced structural parts in this place which may for example be manufactured as injection-moulded parts for which no post-treatment is required. Due to the adjustability of the locking position existing tolerances cannot entail adverse effects. The arrangement of a cull for the bedding of the shaft becomes superfluous so that the valve housing is designed as one piece and comparatively small and simple. The design of the leveling valve in accordance with the invention does not depend on whether the leveling valve controls only one pneumatic bellow or two pneumatic bellows assigned to two different sides of the vehicle are, for example, connected and controlled by way of the leveling valve by way of using an inset or a crossthrottle.

On principle, the housing of the leveling valve with its advantageous design may be made of any material, for example of metal. However, the manufacture and assembly of the leveling valve becomes particularly simple and economical if the housing consists of synthetic material and if the other structural elements, e.g. the shaft and/or the valve plunger and/or a supporting element etc. consist of synthetic material. Here, it is useful to provide a thrust piece that can be inserted into the stepped bore hole in the housing in the direction of the central axis, which constitutes the groove for the gasket together with a step of the stepped bore hole, and which rests on the shaft. It is due to the design and development that a great part of the structural parts of the leveling valve may be made of synthetic material. This holds particularly true for the valve housing which may even be designed as one piece only, but also for the shaft and the valve plunger and the supporting element. As a bulk structural part, it is an advantage if the housing is made of synthetic material in order to utilize the shaping potential of the synthetic material for this purpose. It includes the continuous bore hole with its smallest section in the central area and with adjacent stepped steps towards both ends provided according to the arrangement and design of the other structural parts. On one side of the double valve body, the continuous bore hole ends in a connection for air supply, while on the opposite side the relevant recess for a shimmy valve or the like is covered. This can be used to mount the double valve body together with its spring support from one side in the direction of the central axis. From the other side, it is possible to insert the gasket, a thrust piece and the unit made up of valve plunger and supporting element and to secure these parts by rigging them by means of the shaft. The thrust piece completes a unilaterally open step of the stepped bore hole in the valve housing so as to constitute a groove serving the purpose of receiving the required gasket of the valve plunger. It is an advantage if this thrust piece is made of synthetic material. The bedding of the shaft, also in this case bilateral in relation to the central axis, may be realized in a far more simple manner; special slide bearings are omitted. By means of the symmetrical arrangement the take-up of forces by way of both the unit made up of supporting element and valve plunger and the thrust piece is improved. Due to the application of not post-treated structural parts there exists the risks that manufacturing tolerances will add up in an adverse way, however, the new design of the leveling valve takes into account the adjustability of the locking position so that in this respect a proper and safe function of the leveling valve is nevertheless achieved. The manufacture of the unilaterally open step as a step in the continuous bore hole is far easier than the manufacture as a groove that is only radially open. Such grooves that are only radially open, which are necessary for receiving gaskets, constitute undercuts which, if provided at metal bodies, are manufactured by machining, that is by puncturing process. Of course, synthetic material may also be machined, even relatively easily. However, injection-moulding technology may be used advantageously for the production of plastic parts, in particular for the smaller structural elements such as the thrust piece, the valve plunger or the supporting element.

Another object of the invention will be achieved if the housing and the other structural elements made of synthetic material are designed as plastic injection-moulded parts. When using plastic injection moulding as shaping method undercuts, as represented by a groove that is only radially open, can be produced only if a complexly shaped and also separated core is used in the injection mould. On the other hand, a step that is axially open on one side and that constitutes a groove in connection with a thrust piece can be removed from the mould without difficulty.

The new design of the leveling valve also permits the installation of a spring resting on the supporting element, which guarantees that the unit made up of valve plunger and supporting element is in constant contact with the cam of the shaft. This does not impede the torsion-proof position of the parts in relation to one another The thrust piece and supporting element can be equipped with mating projections and recesses so as to guarantee a torsion-proof axial motion of the supporting element. Hence, the thrust piece does not only support the gasket and secure the axial position of the gasket as well as transmit the axial force acting on the gasket and resulting from the pressure of the compressed air in the pneumatic bellows, but at the same time it fulfils the need for torsion-proof guidance of the supporting element. This in turn requires that the thrust piece be disposed in the valve housing in a torsion-proof way, however, there are several possible ways of implementation. On the other hand, it is possible that the thrust piece is provided only for receiving the axial forces and that it can rest on the shaft. This case requires a torsion-proof bedding of the supporting element at the cam or at the shaft. It constitutes an advantage if the thrust piece is supported at the shaft in a stationary and torsion-proof way. On the other hand, the thrust piece may also be supported at the shaft in a torsion-proof manner. In a preferred embodiment the thrust piece may be equipped with one saddle area each in two locations disposed symmetrically in relation to the central axis and corresponding to the diameter of the shaft. This renders it possible that the outside of the thrust piece is of cylindrical shape and that the relevant recess in the valve housing may also be of cylindrical shape.

Departing from this variation it is also possible, however, that the thrust piece at its outside and the recess in the valve housing at its inside possess an out-of-round section. Such a section, which may for example be hexagonal or octagonal, ensures the torsion-proofness of the thrust piece, while there should be additional torsion-proof bedding of the supporting element at the thrust piece. For this purpose, the thrust piece at its inside and the supporting element at its outside may have one out-of-round section each adapted to one another with play.

The supporting element and the valve plunger may be of one-piece design, an adjustment screw being provided between supporting element and cam. It is understood that also in this case a torsion-proof bedding of the supporting element joined to the valve plunger must be provided.

The shaft may be received in a continuous, stepped bore hole crossing the valve housing and designed in the corresponding stepped way. It is useful that on the side of the valve housing opposite from the actuating lever this step bore hole possesses the greater diameter so that the shaft may be inserted into the valve housing from this side opposite from the actuating lever and rests on a shoulder formed by the stepped bore hole and the stepped design of the shaft and, on the other hand, is secured by rigging by means of the actuating lever. This leads to an unambiguous sequence when assembling or disassembling the individual parts of the leveling valve.

However, it is also possible that the shaft is inserted into a pocket hole installed in the valve housing from the side of the actuating lever. In this case, effective sealing against dirt is omitted, and it must be guaranteed in another fashion that the shaft is held in the valve housing in a secured axial position.

BRIEF DESCRIPTION OF THE DRAWINGS

Embodiments of the invention are represented in the following drawings and set forth hereinafter.

FIG. 4 is a sectional view of another embodiment of the leveling valve.

DETAILED DESCRIPTION

Figure 1:
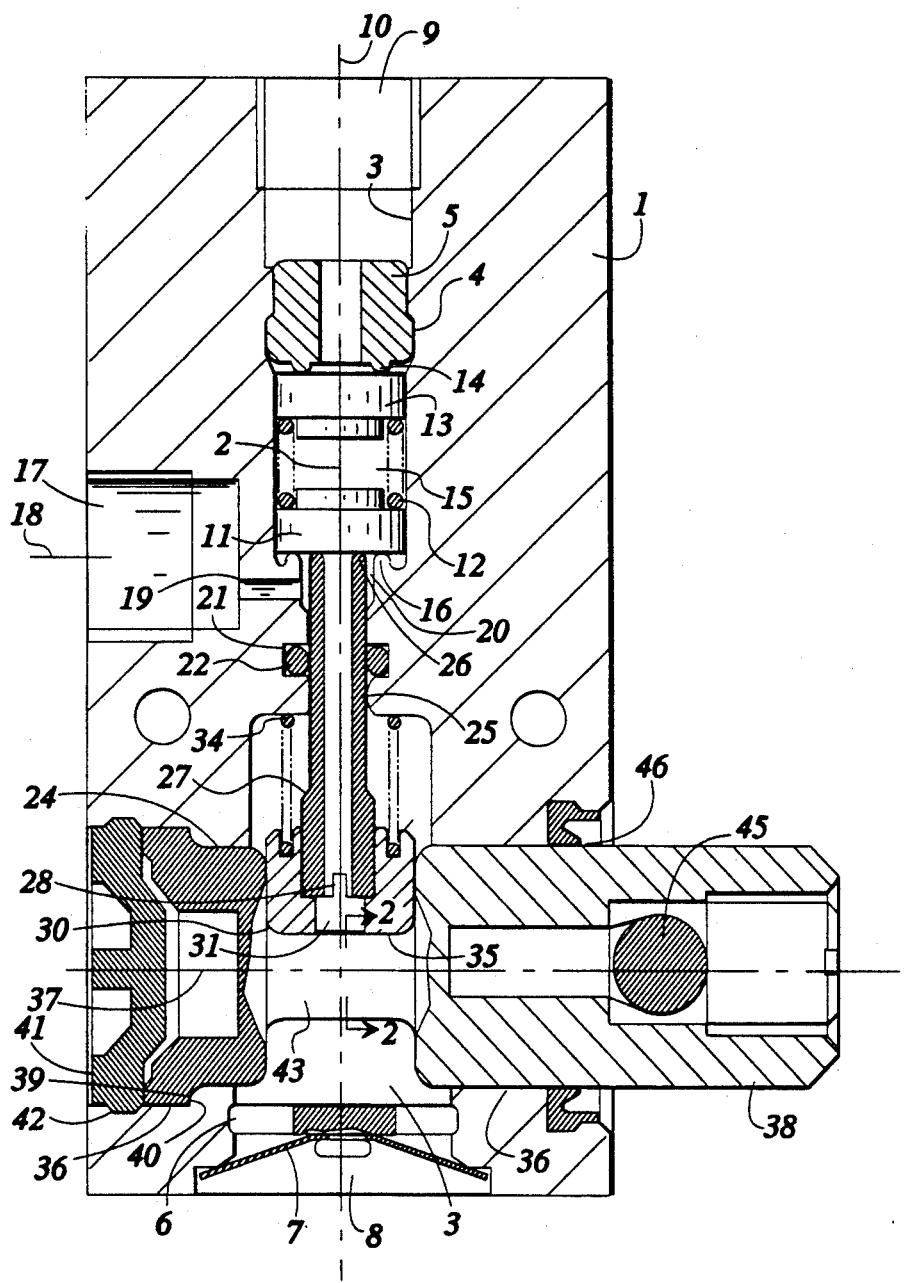
FIG. 1 is a sectional view of a first embodiment of the leveling valve.

The leveling valve as represented in FIG. 1 includes a housing 1 designed as one-piece injection-moulded plastic component or made of metal. Alongside a central axis 2 there is continuous bore hole 3 having the smallest diameter approximately in the middle of the housing 1 followed by adjacent greater diameters increasing in steps in both directions so that ejection of the housing 1 from a mould is easy and that machining is not difficult when it is made of metal. With the exception of a groove 21, the bore hole 3 possesses merely undercuts of low depth as may be bridged by injection when shaping the housing. There is a securing cap 5 pressed into one of those undercuts 4, which may also be designed as plastic injection-moulded part. In another undercut 6 a shimmy valve 7 is disposed, preventing that dirt gets into a vent 8. Undercuts of greater depth that cannot be produced without complicated core separation in a mould for the housing are mostly or fully avoided.

The housing 1 has a connection 9 for a conduit 10 linked to a compressed-air supply. In the bore hole 3, first a double valve body 11, a spring 12, a single valve body 13 and the securing cap 5 are inserted, from the side of the connection 9, the securing cap 5 having an opening and forming a return valve 13, 14 together with the single valve body 13 with the help of a provided seat 14. Between the single valve body 13 and the double valve body 11 there is a reservoir 15 for compressed air, where also the spring 12 is arranged. Together with a seat 16 provided in the housing 1 the double valve body 11 constitutes an inlet valve 11, 16.

The housing includes a connection 17 for a conduit 18 leading to one or several pneumatic bellows which are controlled by way of the leveling valve. Via a radial bore hole 19 the connection 17 is in constant communication with a flow chamber 20 formed in the housing 1, which is provided after the inlet valve 11, 16.

When viewed from the location of the smallest diameter in the direction toward the vent 8, first the bore hole 3 extending alongside the central axis forms a groove 21 whose radial depth is substantially greater than the radial depth of the undercuts 4 and 6. The groove 21 is only radially open (FIG. 1), however, it may also be designed as open in the axial direction toward the vent 8 (FIGS. 3 and 4) so that a gasket 22 which is received by the groove 21, can be inserted from this side. In the bore hole 3 a valve plunger 25 is provided in the direction of the central axis 2, which for purposes of ventilation is hollow and carries an outlet seat 26 at its upper end zone forming an outlet valve 11, 26 together with the double valve body 11. In its lower end zone, the valve plunger 25 possesses a thread 27 and a shape for putting-on a twisting tool, for example a slot 28. By means of its thread 27 the valve plunger 25 is screwed into a thread 29 of a supporting element 30, the supporting element possessing a continuous opening 31. The valve plunger 25 and the supporting element 30 may also be designed as plastic injection-moulded parts. The supporting element 30 has a face 35 at its lower end.

Figure 3:
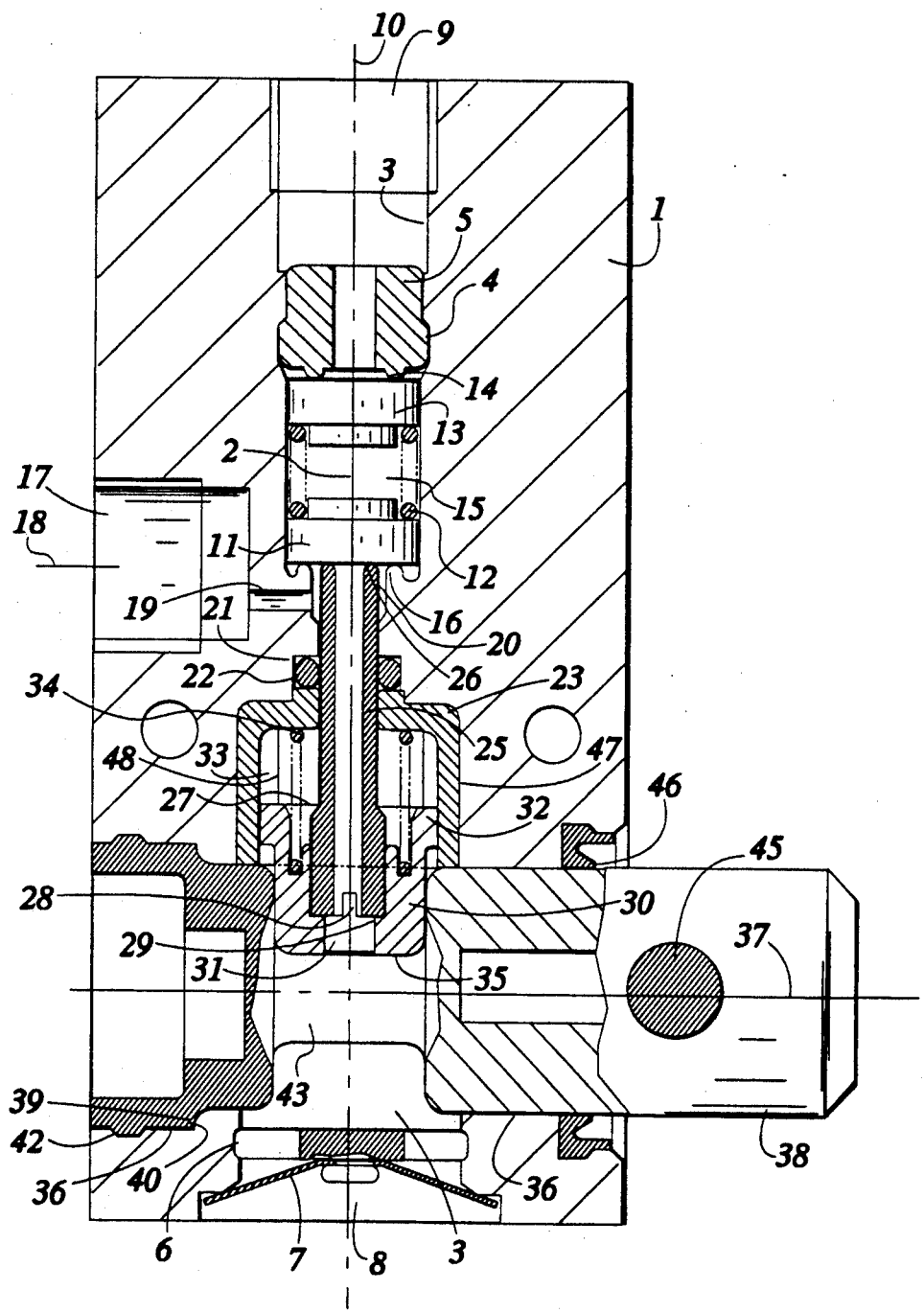
FIG. 3 is a sectional view of a second embodiment of the leveling valve.

Yet the gasket 22 may also be held and pressed-on by a thrust piece 23 in the axial direction (FIG. 3 or 4) which may also be advantageously designed as moulded plastic part. The thrust piece 23 is designed approximately as cut-off hollow cylinder (FIG. 3). However, it may also possess two saddle areas 24 (FIG. 4) located alongside its lower edge. In the embodiment according to FIGS. 3 and 4, in its part extending upwards the supporting element 30 includes projections 32 extending essentially radially to the central axis 2. The projections 32 interact with recesses 33 located at the thrust piece 23 so that the supporting element 30 and the thrust piece 23 may perform an axial motion but no rotation. This enables a torsion-proofness with axial guidance. Instead of the projections 32 and the recesses 33 the correspondingly out-of-round section design in the relevant locations of the thrust piece 23 and the supporting element may be provided in order to reach torsion-proofness in this way. A spring 34 is provided between the thrust piece 23 and the supporting element 30.

Figure 4:
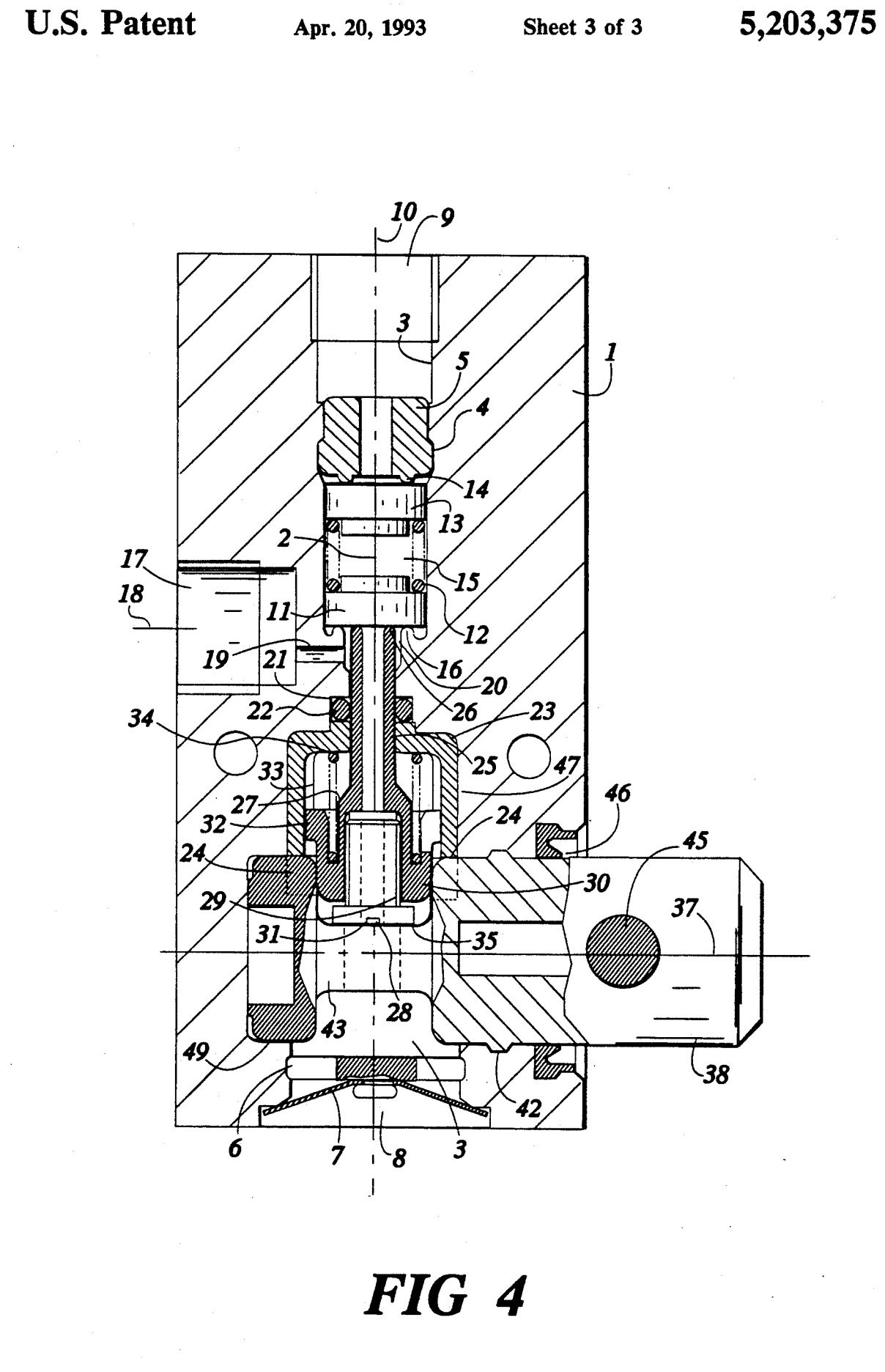

A shaft 38 extending at both sides of the central axis 2 is inserted into a stepped bore hole 36 whose axis 37 extends at a right angle in relation to the central axis 2. The shaft 38 includes a step 39 by means of which it is in contact with a shoulder 40 of the stepped bore hole 36. In the other direction, the shaft 38 is held by a cover 41 snapped into an undercut 42 in the stepped bore hole 36. Also the shaft 38 and the cover 41 may be designed as plastic injection-moulded parts. The shaft 38 is received in the housing 1 at both sides of the central axis 2 in a rotating way. As shown in FIGS. 3 and 4, in particular, the thrust piece 23 possesses a cylindrical exterior diameter with two flattened areas facing one another by means of which it is received in a torsion-proof way between the adjacent steps of the shaft. A cam 43 of the shaft 38 is located inside of the contours of the shoulders of the shaft and is by far smaller than these diameters. Yet there are also other ways of accomplishing the torsion-proof arrangement. According to FIG. 4 both saddle areas 24 of the thrust piece 23 are in contact with shoulders of the shaft 38 in areas of their circumference where they are supported in this respect in a torsion-proof way without impairing the rotation of the shaft 38. In this way, the torsion-proof bedding of the thrust piece 23 is achieved by means of the saddle areas 24 and the tight contact at the corresponding faces of the shaft 38.

Figure 2:
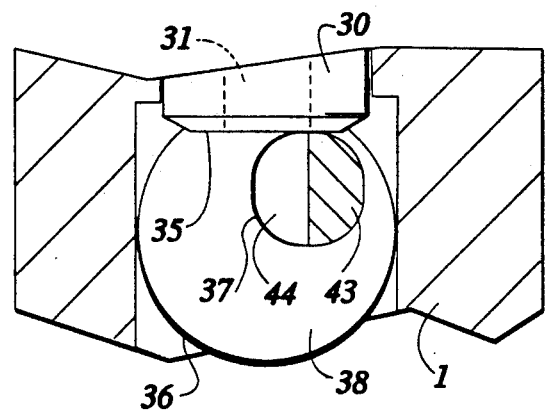
FIG. 2 is a section according to line II—II in FIG. 1.

In its central area the shaft 38 possesses a cam 43 designed as eccentrically disposed link on whose surface the face 35 of the supporting element 30 is supported. FIG. 2 in particular shows how a rotating motion of the shaft 38 is transmitted by way of the cam 43 into an axial motion of the unit made up of supporting element 30 and valve plunger 25. The spring 34 guarantees that the face 35 of the supporting element 30 will always be kept in contact with the surface of the cam 43. At its inside (FIG. 2) the cam 43 possesses a recess 44 so that in this position free accessibility of the slot 28 at the valve plunger 26 will be guaranteed after the shimmy valve 7 has been disassembled in order to adjust the locking position, that is the relative postititon of the outlet seat 26 to the seat 16.

The shaft 38 protrudes from the housing 1 at one side, where it is connectred to an actuating lever 45 by way of which the shaft get its rotating motion in a known manner. Together with the cover 41, a gasket 46 against dust and liquids protects the bedding of the shaft 38 in the housing.

It can be recognized from the preceding description that almost all individual parts of the leveling valve can be manufactured as injection-moulded parts so that there will be no machining post-treatment. The assembly of the individual parts of the leveling valve is also evident. The parts are inserted one after the other and rigged so that they will not fall out. In particular the shaft 38 holds the unit made up of supporting element 30 and valve plunger 25 on the one hand and the thrust piece—if there is any—on the other hand, which not only serves the purpose of pressing on the gasket 22 but also of taking up the force exerted on the gasket 22 by the pressure. It can also be recognized that the individual parts of the leveling valve can be disassembled without difficulty for purposes of maintenance and repair work so that wearing parts, for example the gasket 22 may be replaced easily without having to remove the housing 1 of the leveling valve from the vehicle. The function of the leveling valve is per se known and for this reason requires no further description. Despite its simple design the locking position may be adjusted also for this leveling valve, the torsion-proof bedding of the thrust piece 23 at the shaft 38 and the torsion-proof bedding of the supporting element 30 at the thrust piece 23 rendering possible to turn the valve plunger 25 in relation to it and reach a relative axial displacement of the outlet seat 26 by means of the threads 27 and 29.

To a large extent the leveling valve represented in FIG. 3 is similar to the embodiment shown in FIGS. 1 and 2. Only the thrust piece 23 and the design of the shaft 38 are different. In its lower part the thrust piece 23 has a circumferential end wall. The torsion-proof position of the supporting element 30 must be accomplished in another way. For this purpose, the bore hole 3 crossing the entire housing 1 is equipped with an out-of-round sectional shape in the range of the thrust piece 23, for example in the shape of a hexagon or octagon. It is understood that the outer surface 47 is designed accordingly in the shape of this hexagon or octagon. Also on its inner side the thrust piece 23 may be equipped with an out-of-round surface 48, e.g. in the shape of a hexagon or octagon, the projections 32 of the supporting element 30 being adapted to this shape. In this way, the thrust piece 23 is bedded at the housing 1 in a torsion-proof manner and the supporting element 30 is bedded in a torsion-proof manner at the thrust piece 23 so that also this respect the valve plunger 25 is turned by the respective action of forces at the slot 28 and the locking position can be adjusted.

In this case, the shaft 38 comes in one part with the cover 41. Thus, the shaft 38 forms the cover at the same time and it also has a circumferential rib that gets engaged in the undercut 42.

In the embodiment according to FIG. 4 the thrust piece 23 is equipped with the two saddle areas 24. However, also in this case there is no separate cover 41. In this respect, the shaft 38 is designed as one piece and inserted into a pocket hole 49, while also in this case a circumferential edge gets engaged in an undercut 42. The advantage of this design is that an additional opening at the housing 1 is avoided and in this respect another spot at the leveling valve is avoided where dirt could gather.

In this case, the valve plunger 25 and the supporting element 30 are designed as one piece. In order to render the locking position adjustable an adjustment screw 50 is provided in a thread at the supporting element 30 or the valve plunger 25, which can be turned in a similar way as the abovementioned valve plunger 25 in the embodiments of FIGS. 1 to 3. Also the relative height of the outlet seat 26 may be adjusted in this way; only in this case the valve plunger 25 itself is bedded in a torsion-proof way and thus cannot be turned during the adjusting process.

List of reference signs:

1 = housing
2 = central axis
3 = bore hole
4 = undercut
5 = securing cap
6 = undercut
7 = shimmy valve
8 = vent
9 = connection
10 = conduit
11 = double valve body
12 = spring
13 = single valve body
14 = seat
15 = reservoir
16 = seat
17 = connection
18 = conduit
19 = radial bore hole
20 = flow chamber
21 = groove
22 = gasket
23 = thrust piece
24 = saddle area
25 = valve plunger
26 = outlet seat
27 = thread
28 = slot
29 = thread
30 = supporting element
31 = opening
32 = projection
33 = recess
34 = spring
35 = face
36 = stepped bore hole
37 = axis
38 = shaft
39 = step
40 = shoulder
41 = cover
42 = undercut
43 = cam
44 = recess
45 = actuating lever
46 = gasket
47 = surface
48 = surface
49 = pocket hole
50 = adjustment screw

I claim:

1. A leveling valve for stabilizing the chassis height of a motor vehicle having a pneumatic shock absorption system wherein said valve comprises:

a unitary housing including a first end, an intermediate portion, and a second end.

a first bore hole extending between said first end and said second end through said unitary housing, said first bore hole including a first cross section having a first cross sectional dimension in said intermediate portion of said unitary housing and including a plurality of discrete longitudinal sections successively extending from said intermediate portion toward said first end and another plurality of discrete longitudinal sections successively extending toward said second end, said sections having a greater cross sectional dimension than the preceding section, a valve seat formed in said first bore hole, a flow chamber adjacent said valve seat for communication with the pneumatic shock absorption system, a double valve body within said first bore hole in a section adjacent said valve seat, a spring means biasing said double valve body toward closed relationship with said valve seat, a valve plunger defining an exhaust passage therethrough and positioned within said first bore hole in said first section and axially movable with respect to said unitary housing through said flow chamber and said valve seat, and means extending transversely of said housing for moving said valve plunger axially of said first bore hole through said flow chamber and valve seat and into and out of engagement with said double valve body to close alternately the exhaust passage of said plunger and urge said double valve body away from said valve seat to permit passage of fluid about said double valve body to said flow chamber or to retract said valve plunger from said double valve body and open the exhaust passage, whereby said double valve body and said valve plunger are insertable into said first bore hole within said unitary housing of the leveling valve from above and below said unitary housing so that no disassembly of said unitary housing is required for assembling the parts of the leveling valve, wherein said means for moving said valve plunger is insertable in said unitary housing through a continuous second bore hole having a first side and a second side extending transversely within said unitary housing and through a section of said first bore hole and having a plurality of discrete transversely extending sections successively from said first bore hole toward said first side and toward said second side, each successive end of said transversely extending sections having a greater cross sectional dimension than the adjacent preceding section.

2. The leveling valve of claim 1, where the leveling valve includes a gasket within one of said sections and means for supporting said gasket within one of said sections, said gasket supporting means comprising a groove within said unitary housing adjacent said first bore hole for receiving said gasket to seal between said housing and said valve plunger.

* * * * *